Patented Sept. 15, 1953

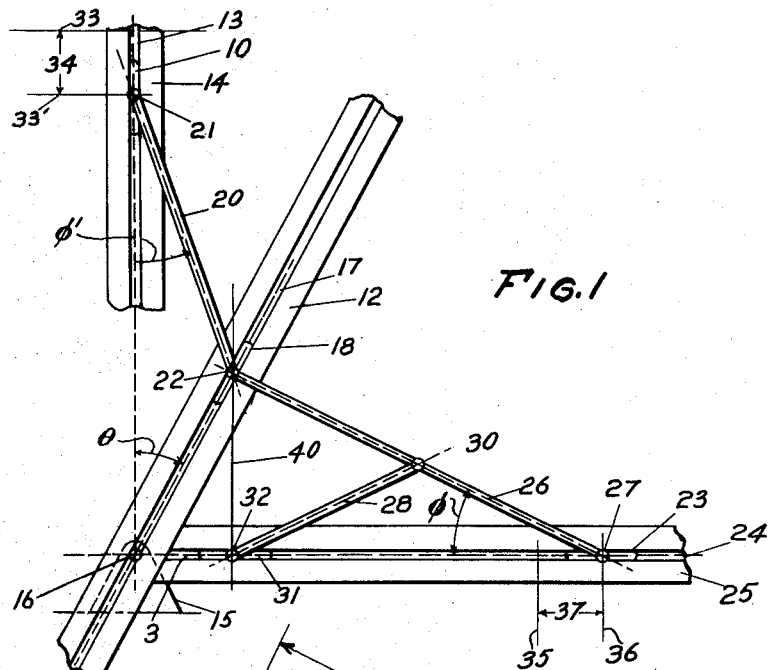
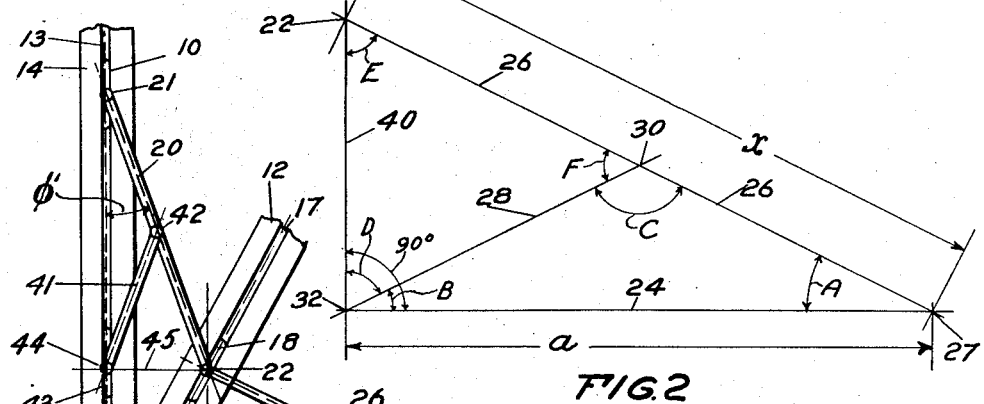
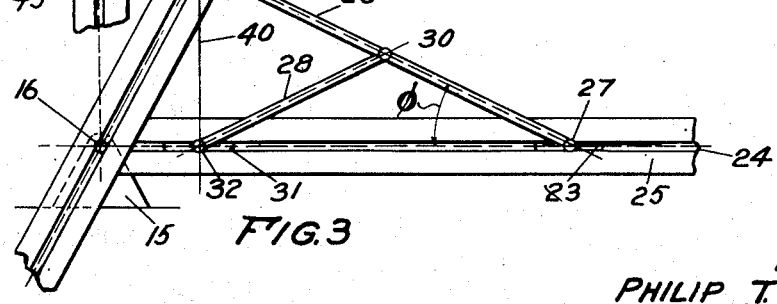

2,652,195

UNITED STATES PATENT OFFICE 2,652,195

CORRECTION DEVICE FOR FUNCTION GENERATORS

Philip T. Nickson, East Braintree, Mass., assignor to Raytheon Manufacturing Company, Newton, Mass., a corporation of Delaware Application February 27, 1951, Serial No. 212,912

9 Claims. (Cl. 235—61)

This invention relates to function generators and more particularly to devices for correcting certain errors in mechanical slide and linkage multiplication and division function generators.

In mechanical slide and linkage multiplication and division function generators of the type disclosed in the copending application, Serial No. 190,456, filed October 17, 1950, by Sumner D. Lewis, one factor of the multiplication is entered either by an angular or by a linear displacement of the first input element which is communicated to a second input member by a link. The angular displacement of the second input member represents the other factor of the multiplication. The total resultant linear displacement of a slide member mounted in a slot on the second input member represents the product. This displacement is transmitted to a slide mounted in a slot on a fixed frame member by a pivoted link connecting the slide members. Due to the geometry of the mechanism, the linkage joining the slide members on the rotatable input and the fixed output members is positioned at different angles to the output slide's path in its different positions. This output link rotates about its pivots on the slidable members. The vector distance between the points of attachment of this link on the two slides remains constant but because of the rotation the projection of this distance on the center line of the output slide's slot varies as the cosine of the angle the link makes with the center line of the fixed output slot. This projection is not of a constant length and so a constant value is not added to the displacement of the pivot point on the slide member of the rotating input member as the pivot point in the output slide is displaced. This deviation from a constant increment introduces an error into the output. With small displacements of the inputs, this error is very slight and may be ignored in many applications. However, with relatively large displacements of the input, and in some applications, it becomes too great to be ignored.

This source of error is corrected in the present invention by adding an additional link pivoted at the mid-point of the link joining the slides on the rotatable input and the fixed output slide. This added link is made one-half the length of the link to which it is joined. The linear displacement of the slide joining the new link to the output slot is the measure of the product of the multiplication. For geometric reasons to be explained later, the pivot point of the new slide lies at all times on a perpendicular line dropped from the pivot point of the slide on the rotatable input member. As the input fixed slot is at right angles to the output fixed slot, the displacement of the new slide is at all times equal to the displacement of the slide on the rotatable input member. Thus this source of error is eliminated.

It is possible to further increase the accuracy of the multiplier by pivotally attaching such a link to the mid-point of the link between the input slide on the fixed input slot and the slide on the pivoted input member. The other end of this added link is attached to a second slide in the fixed input slot. This second input slide may be fitted into a separate fixed slot collinear with the original input slot. This added link is one-half the length of the link to which it is pivotally attached. The displacement of the new slide measures the input. As before, for geometric reasons, it is at all times on a perpendicular line dropped to the input slot center line from the slidable member of the pivoted input member. This removes the possibility of error due to the varying angle of the link joining the input slide to the slide member on the rotatable input member.

Thus by the addition of a link and slide member to either the input or the output, or both, of a mechanical slide and linkage multiplication and division function generator, the accuracy of the device is considerably increased.

These, and other advantages, features and objects of the invention will become more apparent from the following description taken in connection with the illustrative embodiments in the accompanying drawings, wherein:

Fig. 1 is an illustrative schematic diagram of one embodiment of the invention;

Fig. 2 is a diagrammatic illustration of the principle of the invention; and

Fig. 3 is an illustrative schematic diagram of another embodiment of the invention wherein a link and slide member have been added to the input as well as to the output.

In referring to Fig. 1 for clarity of discussion, a particular set of dimensions will be assigned to the various members. However, it should be understood that such a linkage arrangement will act as an approximate multiplier or divider for practically any linkage geometry that might be selected. Therefore, the dimensions used are intended to be illustrative only, and not restrictive. The illustrative embodiment in Fig. 1 when used as a multiplier has first and second input members 10 and 12. The first input member 10 is mounted to slide within a slot 13 in a frame member 14. The second input member 12 is pivoted to the frame 15 at 16 and is formed with a slot 17 within which a slide 18 is mounted. A link 20 is pivotally fastened to slides 19 and 18 at points 21 and 22, respectively. The linear displacement of point 22 is communicated to a slide 23 fitted in a slot 24 in a frame member 25 by a link 26 pivotally attached to the slide 18 at point 22 and to the slide 23 by pin 27.

At the center of link 26 a third link 28 is pivotally attached by pin 30. This link 28 is attached at its other end to a slide 31 in the slot 24 in frame member 25 by a pin 32.

The dimensions are selected for the various parts by the design procedure described in the cited copending Lewis application. It is not thought necessary to repeat a description of this design procedure at this point.

As more fully described in the copending Lewis application referred to above, one factor of a multiplication is represented by the linear displacement of slide 10 from the position represented by line 33 to that represented by line 33′, a distance represented by the dimension 34. The second factor is represented by the angular displacement θ of the pivoted input 12. The result is to displace the slide 18 both angularly and linearly along the slot 17. This displacement is communicated to the slide 23 by the link 26 and moves the pin 27 from the position represented by the line 35 to that represented by the line 36, a distance represented by the dimension 37.

It will be readily apparent from a consideration of the geometry of the arrangement that the displacement measured by the dimension 37 will not always be equal to the displacement of the point of intersection 32 of a line 40 dropped from point 22 perpendicular to the center line of the slot 24. If this be true, the distance from point 32 to point 27 should always be the same. This cannot be true because the distance from 32 to 27 is a function of the angle, φ, the center line of the link 26 makes with the center line of the slot 24. More specifically, the distance from 32 to 27 equals the cos φ times the length of the link 26. Thus the displacement of the point 27 is not a true measure of the displacement of point 22.

From the above it will be seen that, if a point on the center line of the slot 24 could be located that was always on the perpendicular line dropped to that line from the point 22, it would be an accurate index of the linear displacement of the point 22 along a line parallel to the center line of the slot 24. The displacement of this point would be proportional at all times to the product of the multiplication.

Such a point may be located by the linkage 28 of the present invention. This can best be seen by reference to Fig. 2 wherein the output linkage is represented by a triangle in which point 22 is the center of the pin 22, the point 27 is the center of the pin 27, the point 32 is the center of the pin 32, and point 30 is the center of the pin 30. The side of the triangle joining points 22 and 27 is proportional to the length of the link 26. The point 32 lies on the center line of the slot 24 and on the perpendicular line 40 dropped from the point 22 to the center line of the slide 24. The dimensions of the triangle in Fig. 2 are proportional to the corresponding dimensions of the linkages in Fig. 1, and the corresponding angles of the two figures are equal. If the length of the link 26 is taken to be $x$ and the distance from point 32 to point 27 is taken to be $a$, and the angle between the link 26 and the center line of the slot 24 as A, then $a = \cos Ax$. As explained before, $x$ is a constant and A is a variable depending upon the settings of the input slide 10 and the input member 12. Thus $a$ is a variable.

If the point 30 is located at the mid-point of the link 26 and the line 28 drawn between it and the center line of the slot 24 and has a length equal to one-half the length of link 26, two isosceles triangles are formed, one joining the points 22, 30 and 32 and the other the points 27, 30 and 32. Of the first-mentioned triangle, the sides joining the points 22 and 30, and 30 and 32 are equal to each other, each being equal to one-half the length of link 26. Thus the angles D and E opposite these sides are equal. Of the second-mentioned triangle, the sides joining the points 27 and 30, and points 30 and 32 are equal, as each is one-half the length of the link 26 by construction. As before, the angles A and B opposite each of these sides will be equal also. By construction, $$<F + <C = 180°$$

as the link 26 is a straight line. Also $$<A + <B + <C = 180° \quad (1)$$

and $$<D + <E + <F = 180° \quad (2)$$

substituting equals for equals:

$$2B + C = 180° \quad (3)$$
$$2D + F = 180° \quad (4)$$

Adding (3) and (4),    $2B + C + F + 2D = 360°$
substituting,    $2B + 2D + 180° = 360°$
simplifying,    $2B + 2D = 180°$
dividing through by 2,    $B + D = 90°$ Thus the line joining point 22 and point 32 is perpendicular to the center line of the slot 24 at all times. Thus it has been seen that the addition of the link 28 locates a point 32 on the center line of the slot 24 having the same perpendicular distance from the slide 13 as the point 22 and the displacement of this point will be an accurate representation of the product of the multiplication of the factor represented by the linear displacement 34 of the input slide 10 and the factor represented by the angular displacement θ of the input element 12.

For much the same geometric reason a linear displacement of slide 10 is not accurately communicated to slide 18 by link 20 as this link is at various angles φ′ to the center line of slot 13, the particular angle depending upon the relative positions of the slides 10 and 18. Again this can be corrected by providing a means by which the slide input is always maintained on a perpendicular line dropped from a point 22 to the center line of the slot 13. As shown in Fig. 3, this is provided by the link 41 pivotally attached at one end to the center point of the link 20 by a pin 42 and at the other end to a slide 43 in the slot 13 by the pin 44. The link 41, as before, is made one-half the length of the link 20 to which it is attached. The slot in which the slide 43 travels need not be the same as slot 13. It is sufficient if it is collinear with it. A proof similar to that used for the link 28 will show that the center point of the pin 44 will always lie at the intersection of a line 45 dropped from the point 22 perpendicular to the center line of the slot 13.

For simplicity of explanation, the center lines of the slots 13 and 24 have been shown as perpendicular to each other and intersecting at the pivot point 16 of the input element 12. This condition is not necessary to the operation of the multiplier. However, any other configuration introduces other possibilities of errors that must be accounted for in the design of the equipment by methods that are no part of the present invention.

As explained in the copending above-cited Lewis application, the basic structure described as a multiplier may be used as a divider by inserting a dividend in the form of displacement 37 of the slide 23 and inserting the divisor by displacing either slide 10 or rotating input member 12 with the resulting displacement of the unused element 10 or 12 as the output. The added link 28 or 41 and slide 31 or 43 serve the same purpose of increasing the accuracy in the mechanism when used for division as when used for multiplication.

It is readily apparent that the correction device of the invention can be used wherever linear displacement must be transmitted accurately between a slide in a fixed slot and a slide in a rotating element. Its use in a multiplication and division device of the type disclosed in the Lewis application is one of several possible applications.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A correction device for a function generator of the type having two mechanical displacement inputs, one of which comprises a rotary element carrying a slide in a slot, the center line of which passes through the pivot of the rotary element, and an output element comprising a fixed element formed with a slot carrying a slide and a linkage member joining the slides, said correction device comprising a third slide adapted to travel in a slot collinear with the slot in the fixed element and a second linkage member half the length of the first-mentioned linkage member and engaging the mid-point of said linkage member and the third-mentioned slide.

2. A correction device for a two variable multiplier and divider system of the type having mechanical displacement input members, one of which inserts the valve of one of said variables as an angular displacement quantity, said input member having a pivot point and carrying a slide in a slot, the center line of the slide passing through the pivot point, a mechanical output member for indicating the answer as a linear displacement quantity, slide means coupled to said angular displacement input member, and a linkage member engaging said slide means and output member, thereby causing mechanical cooperation between said input and output members for producing said answer, comprising a second slide means adapted to move collinearly with the linear displacement of the said output member and a linkage member half the length of the linkage member engaging said slide means and output member joining the mid-point of said linkage to the second slide means to accurately represent the linear displacement of the first-mentioned slide means and thus the answer.

3. A correction device for a function generator having a first slidably mounted input member, a second pivotally mounted rotative input member, slide means on said second member, the center line of which passes through the pivot of the rotative member, a connecting link engaging said first member and slide means, slidably mounted output means, and a connecting link engaging said slide means and output means, comprising a third slide means adapted to move collinearly with the linear displacement of the said slidably mounted input member and a third connecting link half the length of the first-mentioned connecting link connected between the mid-point of said first-mentioned connecting link and the third slide means to accurately communicate its linear displacement to the slide means on the second input member.

4. A correction device for a function generator having a first slidably mounted input member, a second pivotally mounted rotative input member, slide means on said second member, the center line of which passes through the pivot of the rotative member a connecting link engaging said first member and slide means, slidably mounted output means and a connecting link engaging said slide means and output means, comprising a third slide means adapted to move collinearly with the linear displacement of the said slidably mounted input member and a third connecting link half the length of the first-mentioned connecting link connected between the mid-point of said first-mentioned connecting link and the third slide means to accurately communicate its linear displacement to the slide means on the second input member, and a fourth slide means adapted to move collinearly with the displacement of the said slidably mounted output member and a fourth connecting link half the length of the second-mentioned connecting link connected between the mid-point of said second-mentioned connecting link and the fourth slide means to accurately represent the linear displacement of the slide means on said second input member and thus the function.

5. A correction device for a two variable multiplication and division function generator of the type having a first slidably mounted input member, a second pivotally mounted rotative input member, slide means on said second member causing movement along a center line through said pivotal mounting, a connecting link engaging said first member and slide means, slidably mounted output means, and a connecting link engaging said slide means and output means, said correction device comprising a second slidably mounted output means adapted to move collinearly with the first said means and a third connecting link half the length of second said connecting link engaging the mid-point of said second connecting link and said second slidably mounted output means to accurately transmit the linear displacement of said slide means to indicate the value of the function.

6. A correction device for a two variable multiplication and division function generator of the type having a first slidably mounted input member, a second pivotally mounted rotative input member, slide means on said second member causing movement along a center line through said pivotal mounting, a connecting link engaging said first member and slide means, slidably mounted output means, and a connecting link engaging said slide means and output means, said correction device comprising a second slidably mounted input member adapted to move collinearly with the first, a third connecting link half the length of the first-mentioned connecting link and engaging the mid-point of the first-mentioned connecting link and the second slidably mounted input member to accurately transmit the linear displacement of the slidable input member to the second pivotally mounted rotative input member, and a second slidably mounted output member adapted to move collinearly with the first, a fourth connecting link half the length of the second-mentioned connecting link and engaging the mid-point of the second-mentioned connecting link and the second slidably mounted output member to accurately transmit the linear displacement of the said slide means to indicate the value of the function.

7. A correction device for a two variable multiplication and division function generator of the type having a first slidably mounted input member, a second pivotally mounted rotative input member, slide means on said second member causing movement along a center line through said pivotal mounting, a connecting link engaging said first member and slide means, slidably mounted output means disposed to move in a direction perpendicular to said slidably mounted input member, and a connecting link engaging said slide means and output means, comprising a second slidably mounted output means disposed to move collinearly with the first-mentioned slidably mounted output means and a third connecting link half the length of the second-mentioned connecting link engaging the mid-point of said second connecting link and the second-mentioned slidably mounted output means to accurately transmit the linear displacement of the said slide means to indicate the value of the function.

8. A correction device for a two variable multiplication and division function generator of the type having a first slidably mounted input member, a second pivotally mounted rotative input member, slide means on said second member causing movement along a center line through said pivotal mounting, a connecting link engaging said first member and slide means, slidably mounted output means disposed to move in a direction perpendicular to said slidably mounted input member, and a connecting link engaging said slide means and output means, comprising a second slidably mounted input means disposed to move collinearly with the first-mentioned slidably mounted input means and a third connecting link half the length of the first-mentioned connecting link engaging the mid-point of said first-mentioned connecting link and the second slidably mounted input means to accurately transmit the linear displacement of said slidably mounted input means to the slide means on the second rotatively mounted input means.

9. A correction device for a two variable multiplication and division function generator of the type having a first slidably mounted input member, a second pivotally mounted rotative input member, slide means on said second member causing movement along a center line through said pivotal mounting, a connecting link engaging said first member and slide means, slidably mounted output means disposed to move in a direction perpendicular to said slidably mounted input member, and a connecting link engaging said slide means and output means, comprising a second slidably mounted input means disposed to move collinearly with the first-mentioned slidably mounted input means, a third connecting link half the length of the first-mentioned connecting link engaging the mid-point of said first-mentioned connecting link and the second slidably mounted input means to accurately transmit the linear displacement of said slidably mounted input means to the slide means on the second rotatively mounted input means, a second slidably mounted input member adapted to move collinearly with the first, and a second slidably mounted output member adapted to move collinearly with the first, a fourth connecting link half the length of the second-mentioned connecting link and engaging the midpoint of the second-mentioned connecting link and the second slidably mounted output member to accurately transmit the linear displacement of the said slide means to indicate the value of the function.

PHILIP T. NICKSON.

References Cited in the file of this patent

UNITED STATES PATENTS

| Number | Name | Date |
|---|---|---|
| 1,487,460 | Hanson | Mar. 18, 1924 |
| 2,498,312 | Svoboda | Feb. 21, 1950 |
| 2,543,872 | Schaefer, Jr. | Mar. 6, 1951 |

FOREIGN PATENTS

| Number | Country | Date |
|---|---|---|
| 408,803 | Great Britain | Apr. 19, 1934 |
| 498,999 | Great Britain | Jan. 17, 1939 |